United States Patent
Dutta

(10) Patent No.: US 9,171,294 B2
(45) Date of Patent: Oct. 27, 2015

(54) METHODS AND SYSTEMS FOR PROVIDING MOBILE CUSTOMER SUPPORT

(75) Inventor: Siddhartha Dutta, Peoria, AZ (US)

(73) Assignee: III Holdings 1, LLC, Wilmington, DE (US)

(*) Notice: Subject to any disclaimer, the term of this patent is extended or adjusted under 35 U.S.C. 154(b) by 150 days.

(21) Appl. No.: 13/151,485

(22) Filed: Jun. 2, 2011

(65) Prior Publication Data

US 2012/0309351 A1 Dec. 6, 2012

(51) Int. Cl.
*H04M 1/66* (2006.01)
*G06Q 10/00* (2012.01)

(52) U.S. Cl.
CPC .................................... *G06Q 10/20* (2013.01)

(58) Field of Classification Search
CPC ....... H04W 4/00; H04W 12/06; H04W 8/245; H04W 4/14; H04L 29/08108; H04L 9/3294; H04L 63/1416; G06F 21/34; G06F 8/61
USPC ............... 455/411, 414.1, 419, 466; 713/158; 726/9, 22; 717/174; 379/266.08
See application file for complete search history.

(56) References Cited

U.S. PATENT DOCUMENTS

| | | | |
|---|---|---|---|
| 7,673,340 B1* | 3/2010 | Cohen et al. | 726/22 |
| 2008/0176541 A1* | 7/2008 | Cunningham et al. | 455/414.1 |
| 2009/0124271 A1* | 5/2009 | Roundtree et al. | 455/466 |
| 2009/0132813 A1* | 5/2009 | Schibuk | 713/158 |
| 2010/0120408 A1* | 5/2010 | Beenau et al. | 455/419 |
| 2011/0078572 A1* | 3/2011 | Milazzo | 715/733 |
| 2012/0110565 A1* | 5/2012 | O'Sullivan et al. | 717/174 |

OTHER PUBLICATIONS

International Search Report and Written Opinion dated Aug. 14, 2012 in Application No. PCT/US2012/039800.
International Preliminary Report on Patentability dated May 20, 2013 in Application No. PCT/US2012/039800.

* cited by examiner

*Primary Examiner* — Charles Appiah
*Assistant Examiner* — Alexander Yi
(74) *Attorney, Agent, or Firm* — Meyertons, Hood, Kivlin, Kowert & Goetzel, P.C.

(57) ABSTRACT

Methods, systems, and computer program products are provided for mobile customer support. A customer service request is received at a mobile device from a user associated with the mobile device to access a customer service feature of an application associated with the mobile device. In response to the request, a user context is determined by at least one of saving a state of the application, storing data associated with the application or accessing user activity associated with the application. A communication request comprising the user context is sent to a customer service center ("CSC") associated with the customer service feature. Communication between the CSC and the user is enabled, wherein the CSC accesses the user context and uses the user context during the communication.

20 Claims, 6 Drawing Sheets

METHODS AND SYSTEMS FOR PROVIDING MOBILE CUSTOMER SUPPORT

FIELD OF INVENTIONS

The present disclosure generally relates to the field of providing a customer service. More particularly, the disclosure relates to methods, systems and computer readable mediums for providing the customer service to a customer using a mobile device.

BACKGROUND OF THE INVENTIONS

Many business entities provide customer support services to ensure higher customer satisfaction. Indeed, certain business entities sometimes differentiate themselves from competition by having a better customer support service. Business entities usually establish customer service centers (CSCs) to provide customer support services. A typical customer service center hosts a number of customer service representatives (CSRs) to assist customers with their requests and queries. The business entities advertise their customer service numbers to the customers, which allows the customers to contact the customer service centers.

However, it is often expensive to maintain CSCs. Further, many customers desire support for routine queries or tasks, which do not necessarily require a human CSR. Therefore, many business entities augment their customer support services with self-service options for customers. The self-service options may include, for example, Interactive Voice Response (IVR) systems, customer service web portals, and mobile device based applications (or mobile applications).

Mobile applications allow the customer to self-service their requests or queries using an interface on a mobile device. Mobile applications for self-servicing may be native applications residing on the mobile device and communicating with the business entity's database over a network. Alternatively, the business entity may expose a Wireless Application Protocol (WAP) based self-service interface that customers can access from a WAP browser on their mobile device. A customer may use the mobile application to authenticate herself, and use the self-servicing options provided by the mobile application. If the customer finds the self-servicing options in the mobile application insufficient to address their request or query satisfactorily, she may choose to call a CSR through an advertised customer service contact number. Upon calling the customer service contact number, the customer is usually requested to re-authenticate herself. In addition, the customer is often directed to an IVR that has similarly insufficient self-servicing options as the mobile application. When the customer finally speaks with a CSR (e.g., after navigating the IVR), she often restates her requests to the CSR. This leads to wasting the customer's time, and proves inefficient for the business entity.

Given the foregoing, what is needed is a system, a method and a computer readable medium for providing customer service through mobile applications in a convenient and effective manner.

SUMMARY

The present disclosure meets the above-identified needs by providing methods, systems, and non-transitory computer-readable mediums for providing mobile customer support. In an exemplary embodiment, a customer service request is received at a mobile device from a user associated with the mobile device to access a customer service feature of an application associated with the mobile device. In response to the request, in one embodiment, a user context is determined by at least one of saving a state of the application, storing data associated with the application or accessing user activity associated with the application. A communication request comprising the user context is sent to a customer service center ("CSC") associated with the customer service feature. Communication between the CSC and the user is enabled, wherein the CSC accesses the user context and uses the user context during the communication.

In various embodiments, the application may be installed in a memory of the mobile device. In some embodiments, accessing user activity may include retrieving information from an activity log and/or a request file associated with the application. The method may include receiving a request for authentication from the CSC.

In some embodiments, the method may include determining an authentication context. In various embodiments, determining the authentication context may include at least one of accessing a token, encrypting data, receiving user input, accessing mobile device characteristics or accessing a user profile associated with at least one of the mobile device or the application. The authentication context may include a social security number, an account number, a user identification number, a personal identification number, a password, a token, a biometric, an authentication code associated with the mobile device, and/or an authentication code associated with the application. The authentication context may be determined in response to an authentication request received from the CSC. The authentication context may be included in the communication request. In various embodiments, the CSC authenticates the communication request based upon the authentication context.

In some embodiments, the communication includes voice communication, text message, video communication, audio-video communication, interne protocol (IP) based chat, and/or voice over IP. Enabling the communication may include receiving a communication from the CSC. Enabling the communication may include initiating voice communication with the CSC. The voice communication may be initiated based upon at least one of a phone number stored in the application, an instruction stored in the application, a phone number received from the CSC or an instruction received from the CSC. The phone number may be determined at least partially upon the user context, the authentication context, a time of day, a day of week, the application or a work load associated with the CSC.

In various embodiments, the communication between the CSC and the user occurs without any input by the user. The communication between the CSC and the user may occur regardless of the user responding to voice prompts, navigating menus, answering questions, entering data and/or waiting on hold. The communication between the CSC and the user may include communication between a customer service representative (CSR) of the CSC and the user, where the CSR may be presented with an interface showing at least one of the customer context, the authentication context or account information associated with the user. The method may include determining that the user does not have access to services of the CSC and enabling the communication may include at least one of displaying a help file, navigating to a web site or displaying a message.

Further features and advantages of the present disclosure as well as the structure and operation of various embodiments of the present disclosure are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

I. Overview

Figure 1:
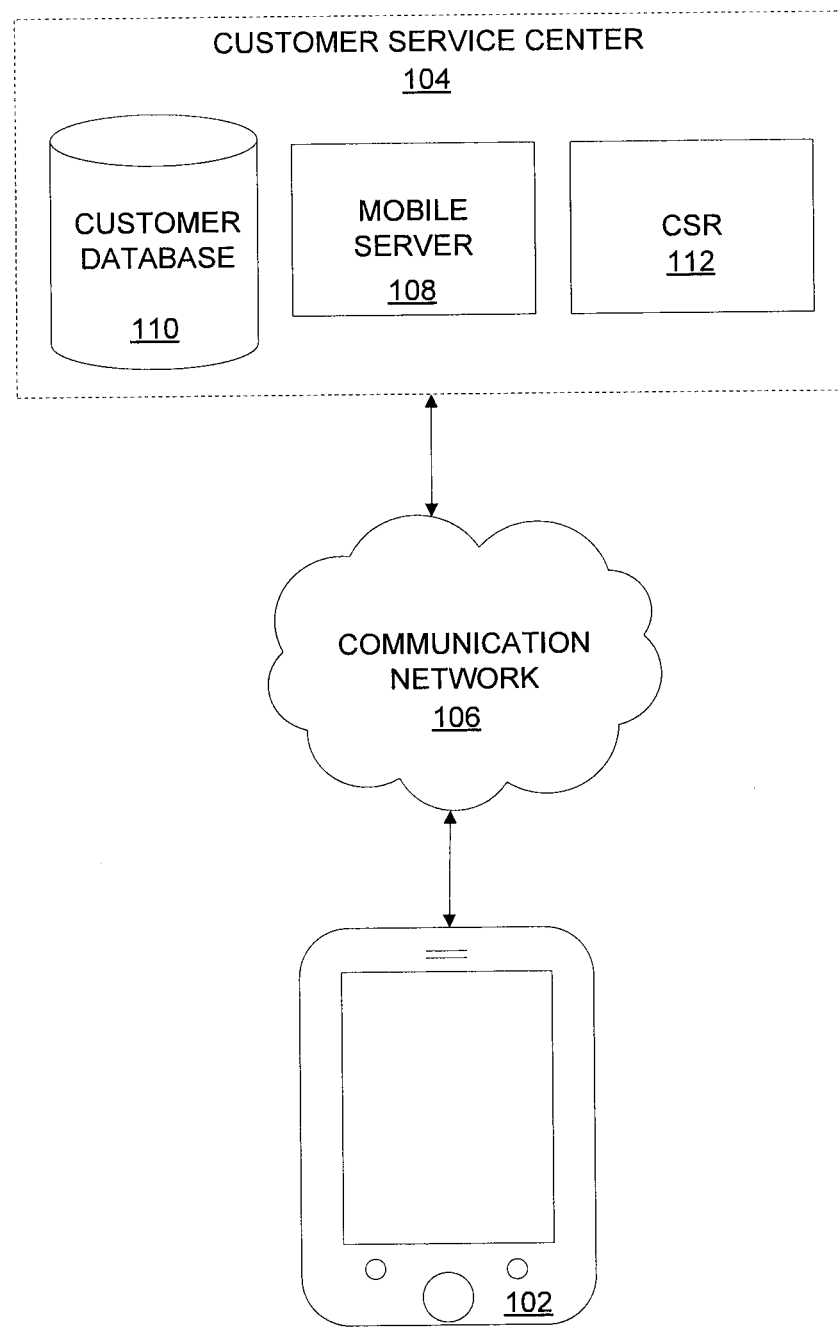
FIG. 1 is an exemplary environment in which a customer support system may be deployed, according to an embodiment.

The detailed description of exemplary embodiments herein makes reference to the accompanying drawings and pictures, which show the exemplary embodiment by way of illustration and its best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

For the sake of brevity, conventional data networking, application development and other functional aspects of the systems (and components of the consumer operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present disclosure is described herein with reference to system architecture, block diagrams and flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

In an embodiment, various components, modules, and/or engines of the system may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

The present disclosure is directed to systems, methods and computer program products for providing customer service on a mobile device of a customer. The mobile device includes an application for enabling the customer to access various customer service features. The application presents a user interface having one or more customer service features that the customer can access. The application may be downloadable from a domain, which hosts the application, and can be installed on the mobile device. The application and/or the mobile device may track the customer's activity with the application and may record the customer's activity information as a part of user's context. The application may further store the customer's authentication context. The authentication context includes information that the customer may use for authenticating with the application and/or a customer service center. The mobile device receives a customer service request from the customer to access the customer service features of the CSC. The mobile device sends a communication request to the CSC. The communication request includes the user context having the customer's activity information. The mobile device may also send the authentication context in the communication request. The mobile device enables the communication between the CSC and the customer. In one example, a CSR communicates with the customer. The CSR uses the user's context during the communication. Thus, the customer may not be required to enter her authentication information and/or the context during the communication, thereby allowing the CSR to serve the customer in a better and effective manner. Consequently, the customer's satisfaction increases.

In various embodiments, the application presents a user interface element, for example, a "click to talk" button, to the customer wishing to communication with the CSC. The user interface element may be provided depending upon one or more criteria. Alternatively, the user interface element may be presented to the customer irrespective of the customer satisfying any of the criteria. Further, the communication may be initiated by the mobile device and/or by the CSC. Various modes of communication are contemplated herein including, without limitation, voice communication, text messages, video communication, audio-video communication, interne protocol (IP) based chat, voice over IP and/or the like.

TERMINOLOGY

A "customer or user" is any entity, including an individual or a group of individuals, using a service or a product and seeking regular details, updates and servicing related queries by interacting with a customer service center. One example of such entity is an American Express credit card holder or any card holder that maintains a transaction account and desires customer service about the account using a mobile device.

Phrases and terms similar to an "item", "product" or "service" may be used interchangeably and include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

A "service provider" generically refers to any provider offering one or more products and/or services to a plurality of customers. In one embodiment, the service provider may be an individual, a group of individuals, a corporate firm, government organization and the like.

The present disclosure is now described in more detail herein in terms of the above disclosed exemplary embodiments of system, processes and computer program products. This is for convenience only and is not intended to limit the application of the present disclosure. In fact, after reading the following description, it will be apparent to one skilled in the relevant art(s) how to implement the following disclosure in alternative embodiments.

II. System

FIG. 1 illustrates a system 100 in which various embodiments may be deployed. System 100 includes a mobile device 102 of a customer, a Customer Service Center (CSC) 104, and a communication network 106. CSC 104 may include a mobile server 108, a customer database 110, and at least one CSR terminal 112. In an embodiment, CSC 104 is deployed by a service provider or by a third party on the service provider's behalf. The service provider may be, for example, a credit card service provider, a banking service provider, a product manufacturer, a third party service provider, and the like. Though mobile server 108 and customer database 110 are shown to be co-located with CSR terminal 112, it need not be so. Either mobile server 108 or customer database 110 or both may be deployed at a location remote to CSR terminals 112.

Communication network 106 provides a communication link between CSC 104 and mobile device 102 of the customer. Communication network 106 is capable of providing the voice and data communications capabilities. Examples of communication network 106 may include, but are not limited to, a wide area network (WAN), a local area network (LAN), an Ethernet, Internet, an Intranet, a cellular network, a satellite network, Public Switched Telephony Network (PSTN) or any other suitable network for transmitting data/voice. Communication network 106 may be implemented as a wired network, or a wireless network or a combination thereof.

Mobile device 102 may include any hardware and/or software suitably configured to facilitate user input, communication with CSC 104, display information related to customer service features or any information discussed herein. As those skilled in the art will appreciate, mobile device 102 may include an operating system (for example, Symbian, Android, iOS, BlackBerry OS, Windows Mobile, Windows Phone, Linux, WebOS, Bada, etc.) as well as various conventional support software and drivers typically associated with mobile devices. Further, mobile device 102 may include a smart phone, a mobile phone, a Personal Digital Assistant (PDA), a pocket PC, a laptop, a tablet PC or the like. Furthermore, mobile device 102 may be in a home or business environment with access to a network. In an exemplary embodiment, access is through a network or the Internet through a commercially available web-browser software package. In one embodiment, access to the Internet is connection is through an application loaded on the device with an internet connection (3G/4G).

Mobile device 102 is also capable of executing an application associated with mobile device 102. According to one embodiment, the application may allow the customer to perform various tasks including, without limitation, access various services (for example, banking services, managing transaction accounts, paying bills, travel-related services etc.) via a network, such as, network 106. In some embodiments, the application may be a customer service application enabling the customer to self-service various products/services. In various embodiments, a user interface may be provided on mobile device 102 of the customer by the application. In one embodiment, the application may be a native application residing on mobile device 102 specific to the service provider. The native application may be downloaded from the service provider website or from a third party domain associated with the service provider. In an alternate embodiment, the application may be a WAP browser-enabled application and may be access by a WAP browser residing on mobile device 102. The WAP browser-enabled application may be hosted by the service provider or by a third party, according to one embodiment.

In various embodiments, the customer may authenticate herself to access various service features of the application. The customer may register with mobile server 108 while downloading the application on mobile device or at the first instance of accessing the user interface on mobile device 102. The customer may be requested to provide basic details at the time of registration. The basic details may vary depending upon the nature of the service. For example, if the application relates to managing transaction accounts, customers may be requested to fill in details such as, for example, credit card number(s), associated expiry date, billing address, contact details, social security number, other customer identifiable information or the like. In another example, if the application is a customer service application for self-servicing a laptop, customers may provide details, such as, without limitation, a vendor's name, model name, model number, model version, unique identification number of the laptop, customer ID, date of purchase, address of store, mode of purchase, payment details or the like. Once these details are provided, mobile server 108 may generate a username for the customer. Alternatively, mobile server 108 may prompt the customer to select a username. Further, mobile server 108 determines authentication credentials for the customer to authenticate the customer for future access to the user interface. The authentication credentials may include, without limitation, at least one of a social security number, an account number, a user identification number, a personal identification number, a password, a token, a biometric, an authentication code associated with the mobile device, an authentication code associated with the application and the like. In an embodiment, the customer may enter appropriate authentication credentials. For example, the customer may choose a password and register the password with mobile server 108. In another example, the customer may enter a biometric, such as a fingerprint as the authentication credential. In this case, mobile device 102 may include or may be configured to be connected to suitable hardware to allow the customer to enter the biometric. In another embodiment, mobile server 108 may generate the authentication credentials, for example, a random password, a unique authentication code associated with the application or the like. A number of techniques for authenticating the customer using mobile device 102 are known in the art. It will be apparent to a person skilled in the art that any of these techniques may be used in conjunction with the present disclosure. In one embodiment, the application stores authentication context including the authentication credentials, of the customer on a local memory of mobile device 102. Alternatively, or in addition, the authentication context may also be stored remotely, for example, on customer database 110.

Again, referring to the FIG. 1, the user interface provided on mobile device 102 is configured to display options to access one or more customer service features of the application. For example, in an application for managing a transaction account, customer service features may include viewing an account summary, inquiring about the payment balance, line of credit, new account application etc., which allow the customer to self-service her support needs. In an application for accessing banking services, the customer service features may include, viewing transaction details, viewing monthly statements, paying utility bills, money transfer or the like. In one embodiment, the user interface displays the options in a graphical user interface (GUI) format and the customer can access them by selecting and clicking on desired option(s).

In response to the customer's interactions on the user interface, the application may communicate with mobile server 108 over communication network 106. In various embodiments, the interactions on the user interface may represent one or more requests from the customer. For example, if the customer selects to view the account summary of her credit card, the application may send a request to mobile server 108. Mobile server 108 may interact with appropriate database, for example, customer database 110 to prepare a response. In the current example, mobile server 108 retrieves the customer's account summary from customer database 110 and send the account summary to the application over communication network 106. The application may then display the response to the customer on the user interface appropriately. In various embodiments, customer database 110 may be deployed by the service provider or a third party.

In an embodiment, the application tracks the customer's activity, such as, for example, customer service features accessed by the customer, requests sent to mobile server 108, responses to the customer's requests, customer service options presented on the user interface or the like. For example, the customer activity may include information such as, the customer first selected to view account summary, and then made payment balance enquiry followed by browsing through various payment options, attempted to pay her current balance through online money transfer, though received an error in doing that. A person skilled in the art will recognize similar examples based upon a deployment scenario. In one embodiment, the application stores the customer's activity on a memory local to mobile device 102. The application may periodically send the customer activity information to mobile server 108, which then may store the information on customer database 110.

Further, the application may also present a user-interface element, which provides the customer an option to communicate with CSC 104. In various embodiments, the user-interface element is a "click to talk" option displayed on the user interface along with other customer service options. In an embodiment, the user-interface element is displayed based on one or more pre-defined conditions. The one or more pre-defined conditions may include, but are not limited to, the number of interactions that the customer has performed with the application in a single session, the customer tier, the level of information requested by the customer or the like. For example, if the customer is a premium customer, the application may display the user-interface element irrespective of the customer's interaction with the application. However, in case of a non-premium customer, until the customer completes a pre-defined limit of the self-service interactions with the user-interface, the user-interface element may not be displayed.

Upon selection of the user-interface element, a customer service request may be triggered. Mobile device 102 and/or the application receive the customer service request. In response to receiving the customer service request, mobile device 102 may determine a user context. In one embodiment, mobile device 102 may save a state of the application as the user context. In another embodiment, mobile device 102 may save data associated with the application as the user context. In yet another embodiment, mobile device 102 may access the user activity information and save it as the user context. In a further embodiment, mobile device 102 may perform any combination of aforementioned steps to determine the user context.

Mobile device 102 may then send a communication request to mobile server 108. In one embodiment, mobile device 102 sends the communication request to mobile server 108. The communication request includes the user context. In one embodiment, the communication request may also include authentication context. The authentication context may include, without limitation, at least one of a social security number, an account number, a user identification number, a personal identification number, a password, a token, a biometric, an authentication code associated with the mobile device, an authentication code associated with the application and the like. Mobile device 102 may determine the authentication context by performing one or more of accessing a token, receiving user input, accessing mobile device characteristics, accessing a customer profile associated with mobile device 102, the application or both, or the like. In one embodiment, mobile device 102 may determine the authentication context in response to an authentication request received from mobile server 108. Mobile server 108 may send the authentication request in response to receiving the communication request or as a part of authentication process when the customer wants to access the application.

Mobile device 102 enables communication between the customer and CSC 104. In various embodiments, the communication occurs between the customer and a CSR. In one embodiment, mobile server 108 may authenticate the communication based upon the authentication context. In one embodiment, the communication is voice communication. In other embodiments, the communication may also be video communication, text message, audio-video communication, internet protocol (IP) based chat, voice over IP or the like.

In one embodiment, the communication may be initiated by the application. For example, when the customer clicks on "click-to-talk" button, the application may obtain a phone number of CSC 104. The application then places a phone call to CSC 104 using mobile device 102. In one embodiment, the phone number may be stored in the application or may be dynamically determined by the application using instructions stored in the application. The instructions may also be received from mobile server 108. In some embodiments, the phone number may be received from mobile server 108. The phone number may be determined using one or more factors. Examples of the factors include, but are not limited to, the user context, the authentication context, a time of day, a day of week, the application, customer's geographic location, the application, a work load associated with CSC 104, customer's preferences and the like. For example, if the user is in USA, the application and/or the CSC may select a US phone number; on the other hand, if the user is in Germany, a phone number may correspond to a Germany-based CSC or a CSC that serves customers residing in Germany. In another example, the phone number may be determined based upon the customer's preferences, such as, language preferences, so that the customer communicates with a CSR proficient in the customer's language preference. In additional examples, the phone number may be different for weekends as opposed to weekdays.

When the communication is enabled between CSC 104 and the customer, CSC 104 accesses the user context and uses the user context to service the customer appropriately. For example, if the user context indicates that the customer was trying to view various payment options for her transaction account when the communication was established, CSC 104 may inform the customer of the payment options during the communication.

In various embodiments, the communication occurs between the customer and a CSR. In this case, at least one of the user context, the authentication context, or account information of the customer may be presented on corresponding CSR terminal, for example, CSR terminal 112, with an interface. The CSR may then use this information to serve the customer.

Thus, the customer is not required to go through conventional interactive voice response (IVR) systems and gets directly connected with appropriate CSC 104 and/or CSR. Moreover, the user context provided to the CSR on CSR terminal 112 enables the CSR to acquire the knowledge of the customer's interactions on the user-interface. This may help the CSR to resolve the customer's request efficiently and within a short period of time.

In additional embodiments, the communication may be initiated by CSC 104. For example, CSC 104 may provide a callback option to the customer. In this case, when mobile device 102 sends the communication request to mobile server 108, mobile server 108 may establishes the communication with the customer. In one embodiment, mobile server 108 may initiate one leg of a phone call to a number associated with the customer, initiate another leg with CSR 112 and bridge the phone call. The call may be established with mobile device 102 or with any other number provided by the customer. In one example implementation, the customer may be provided prior intimation of time when this communication may be established.

In some embodiments, the communication between the customer and CSC 104 occurs automatically without any input from the customer. In further embodiments, the communication may be initiated without requiring the customer to respond to voice prompts, navigate menus, answer questions, enter data, wait on hold, or any combination thereof.

In accordance with one embodiment, the application determines whether the customer does not have access to services of CSC 104, for example, when the communication cannot be established or when CSR 112 etc., the application may display a help file corresponding to the customer service request to the customer. Alternatively, the application may lead the customer to an associated website or display a message.

CSR terminal 112 may include any hardware and/or software suitably configured to facilitate communication with customers over a network, providing customer service, receiving inputs, presenting information related to the customer context, the authentication context, the account information of the customers, or any information discussed herein. As those skilled in the art will appreciate, CSR terminal 112 may include an operating system (e.g., Windows NT, 95/98/2000, OS2, UNIX, Linux, Solaris, MacOS, etc.) as well as various conventional support software and drivers typically associated with computers. Further, CSR terminal 112 may include any suitable personal computer, network computer, workstation, minicomputer, mainframe, thin client or the like.

Mobile server 108 may include any hardware and/or software suitably configured to facilitate communication with customers over a network, receiving, processing and responding to requests, accessing and presenting information related to the customer context, the authentication context, the account information of the customers, or any information discussed herein. As those skilled in the art will appreciate, mobile server 108 may include an operating system (e.g., Windows NT, 95/98/2000, OS2, UNIX, Linux, Solaris, MacOS, etc.) as well as various conventional support software and drivers typically associated with computers. Further, mobile server 108 may take the form of a computer or a set of computers, although other types of computing units or systems may be used, including workstations, computer-servers, main frame computers, PC servers, pervasive computers, network sets of computers, and/or the like.

Customer database 110 stores customer specific information. The customer specific information may include customer's personal information (for example, name, address, telephone number, e-mail address, gender, age, income, family information, education etc.), login ID, authentication credentials, customer's preferences, and/or the like. Customer database 110 may also store product/service specific information for the customers. For example, information for a transaction account service provider may include transaction account numbers, expiry dates, transaction history, transaction details, billing information or like. Customer database 110 may further store information such as, without limitation, the customer's activity with the application, customer service features accessed by the customers, details regarding the customer service requests and associated responses, log of the communication between the customer and CSC 104, and/or the like.

Customer database 110 may employ any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/DEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of customer database 110, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the customer service request, service provider, customers or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate. The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. Customer 110 contemplates a data storage arrangement wherein the header or trailer, or header or trailer history, of the data is stored on the transaction instrument in relation to the appropriate data. One skilled in the art will also appreciate that, for security reasons, any databases, systems, devices, servers or other components of customer database 110 may consist of any combination thereof at a single location or at multiple locations, wherein each database or system includes any of various suitable security features, such as firewalls, access codes, encryption, decryption, compression, decompression, and/or the like. Encryption may be performed by way of any of the techniques now available in the art or which may become available—e.g., Twofish, RSA, El Gamal, Schorr signature, DSA, PGP, PKI, and symmetric and asymmetric cryptosystems.

The disclosure may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Figure 2A:
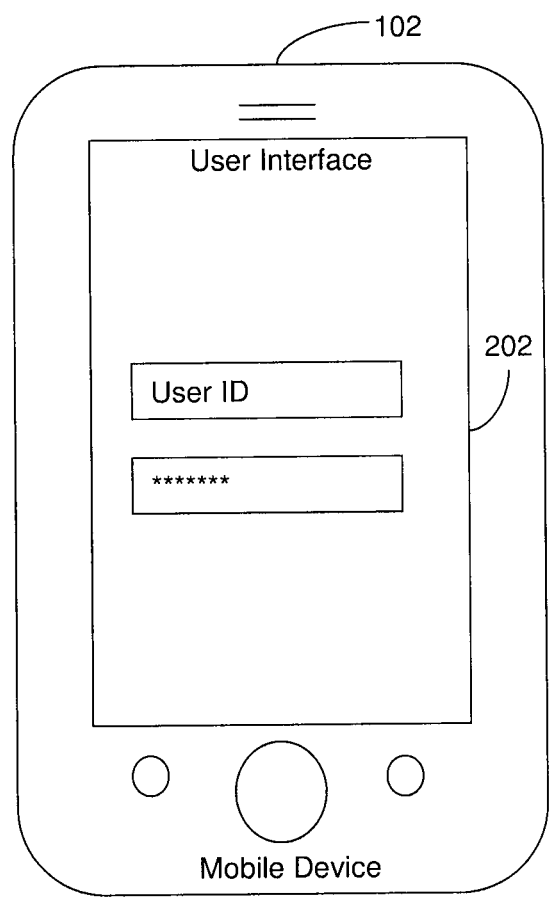
FIG. 2A is a schematic illustration of an exemplary user interface on a mobile device, according to one embodiment.
Figure 2B:
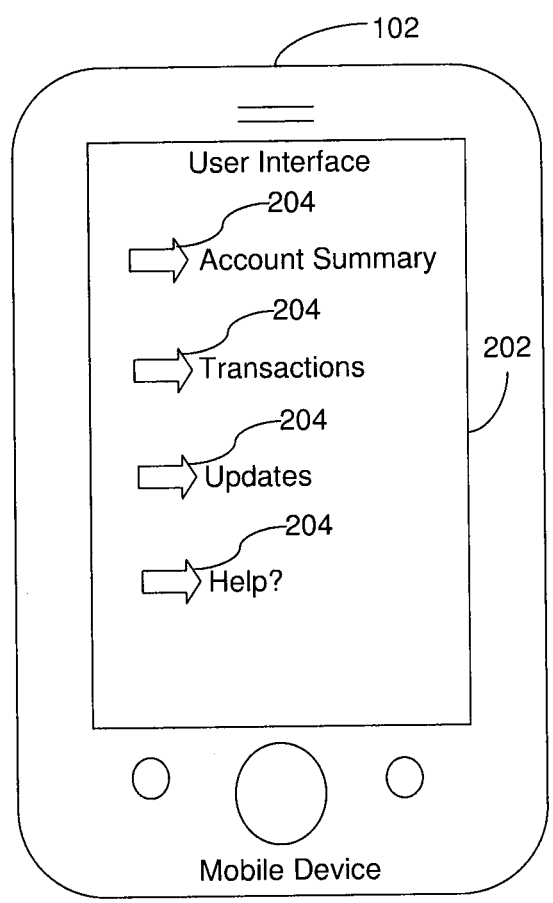
FIG. 2B is a schematic illustration of another exemplary user interface, according to another embodiment.
Figure 2C:
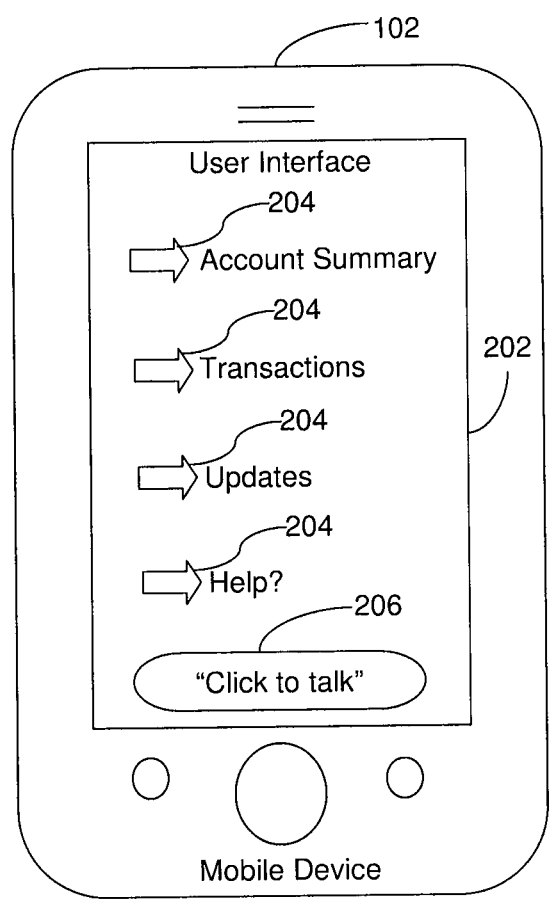
FIG. 2C is a schematic illustration of yet another exemplary implementation of the user interface, according to another embodiment.

FIGS. 2A, 2B and 2C are schematic illustrations of an exemplary implementation of a user interface presented by the application on mobile device 102, according to one embodiment. Referring to the FIG. 2A, the application provides a user interface 202 on mobile device 102, according to one embodiment. In an embodiment, to initiate a session of on mobile device 102, user interface 202 shows an authentication screen for entering a customer ID and a password. In various other embodiments the customer ID and/or password may include a unique combination of customer's identifiable characteristics/authentication credentials, selected by the customer and/or provided by mobile server 108 at the time of the registration process. In an embodiment, in response to entering the customer ID and the password, the application communicates with mobile server 108 over communication network 106 to authenticate the customer. A person skilled in the art will appreciate that other authentication techniques may similarly be used to authenticate the customer.

Referring to FIG. 2B, the application may display one or more customer service features 204 in user interface 202 on mobile device 102. In an exemplary embodiment, customer service features 204 may include service provider specific information. For example, in case of a credit card customer, customer service option 204 may include, account summary, transaction, updates, help or the like. In response to the customer's interactions with customer service features 204, the application on mobile device 102 interacts with mobile server 108 to retrieve corresponding information. The application stores the customer's activity as part of the customer context either locally on mobile device 102, or remotely on customer database 110, or both.

Referring to FIG. 2C, user interface 202 may also display a "click to talk" option 206 along with customer service features 204. "Click to talk" option 206 enables to customer to establish a communication with CSC 104. In this example implementation, the communication may be a voice communication. However, a person skilled in the art will appreciate that this is for illustration purpose only and suitable user interface elements may be presented on the user interface to enable the customer to establish the communication with the CSC via other modes, such as, without limitation, text messages, video communication, audio-video communication, interne protocol (IP) based chat, voice over IP and/or the like. In an embodiment, "click to talk" option 206 may be displayed in response to a certain degree of self-servicing done by the customer, for example, "click to talk" option 206 may be presented only when the customer has accessed a particular service option for more than a threshold duration in a given session, the customer has browsed through "help" service option, the customer has performed at least pre-defined number of transactions without resolving her query or the like. In other embodiments, "click to talk" option 206 may be displayed to the customer irrespective of the customer performs any activity with the application. In response of exercising "click to talk" option 206, mobile device 102 initiates a customer service request and communication may be established between the customer and CSC 104, in accordance with various embodiments presented herein. In one embodiment, the communication may be initiated by mobile device 102. In alternate embodiments, the communication may be initiated by CSC 104.

III. Process

Figure 3:
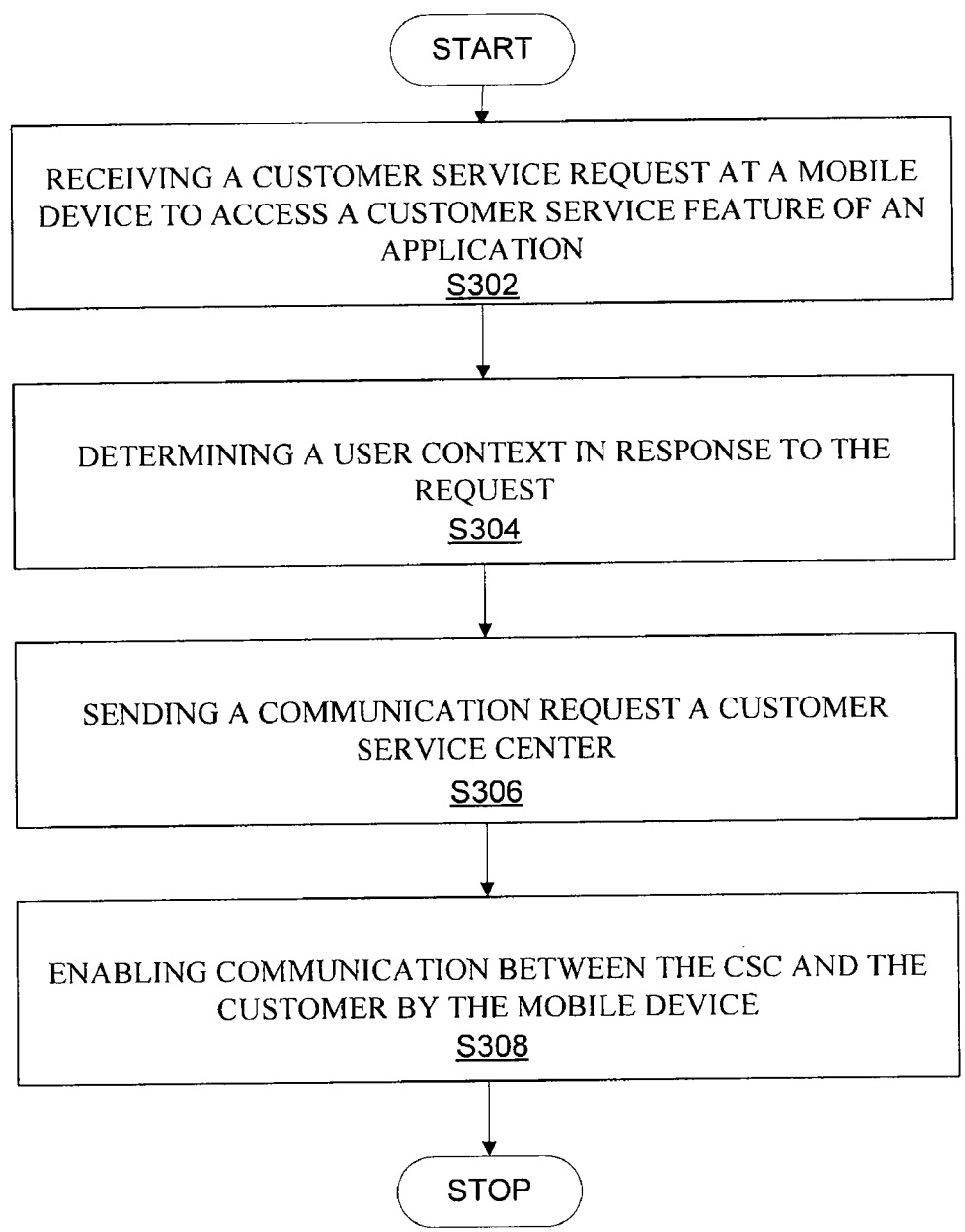
FIG. 3 is a flow chart illustrating one example process for providing customer service on a mobile device, according to one embodiment.

FIG. 3 is a flowchart illustrating an example process 300 for providing customer support on a mobile device of a customer. In one embodiment, process 300 may be implemented on a customer's mobile device, for example, mobile device 102. In step S302, a customer service request is received at the mobile device from the customer to access a customer service feature of an application. In one embodiment, the application is installed in a memory of the mobile device. In another embodiment, the application may be accessed via a network using a WAP browser residing in the mobile device.

In one embodiment, the customer may be requested to authenticate herself with the application and/or with a Customer Service Center (CSC) associated with the application. In one example implementation, when the application receives the customer service request, the application may forward the customer service request or any other request associated with the customer service request to the CSC. In response, the CSC may send a request for authentication. The application receives the authentication request and prompts the customer to enter desired authentication credentials. The authentication credentials may include, without limitation, at least one of a social security number, an account number, a user identification number, a personal identification number, a password, a token, a biometric, an authentication code associated with the mobile device, an authentication code associated with the application and the like. Once the customer is authenticated successfully, the customer may be able to access the customer service feature.

In step S304, a user context is determined in response to the request. The user context may include at least one of customer service features accessed/browsed by the customer, respective timestamps, amount of time spent by the customer on each service option, any assistance provided to the customer using a help section of the application, customer's attempts to access any specific information using a customer service features and other similar interactions with the application. The user context may be built by tracking the customer's activity and saving it in a log file. In one embodiment, the user context may be determined by saving a state of the application. In another embodiment, the user context may be determined by storing data associated with the application. In yet another embodiment, the user context may be determined by accessing user activity associated with the application. In one example implementation, the user activity with the application may be retrieved from an activity log or from a request file associated with the application or both. The activity log may reside in the memory of the mobile device. Alternatively, the activity log may be stored in a database remote from the mobile device and the mobile device may access the database via a network. Similarly, the request file may be stored locally and/or remotely.

In step S306, a communication request is sent by the mobile device to the CSC associated with the customer service request. The communication request includes the user context. In one embodiment, the communication request may further include an authentication context. The authentication context may include, without limitation, at least one of a social security number, an account number, a user identification number, a personal identification number, a password, a token, a biometric, an authentication code associated with the mobile device, an authentication code associated with the application and the like. In one embodiment, the authentication context may be determined upon receiving the authentication request from the CSC. In another embodiment, the authentication context may be determined when the communication request is generated.

According to one embodiment, the authentication context may be determined by accessing the mobile device characteristics and retrieving relevant information (for example, the authentication code associated with the mobile deice) from the mobile device characteristics. In another embodiment, the authentication context may be determined by accessing a user profile associated with the mobile device or the application or both. For example, the user profile may include information such as, the user identification number, the account number, the social security number, the personal identification number etc. In yet another embodiment, the authentication context may be determined by receiving the authentication context via a user input. For example, the user may enter one or more of the password, the user identification number, the personal identification number, or the biometric. In a further embodiment, the authentication context may be determined by accessing a token. In yet another embodiment, the authentication context may be determined by encrypting data.

In step S308, communication between the CSC and the customer may be enabled by the mobile device. The communication may be a voice communication, a text message, a video communication, an audio-video communication, an internet protocol (IP) based chat, a voice over IP and the like. The CSC may authorize the communication based upon the authentication context. In one embodiment, the communication happens between a Customer Service Representative (CSR) and the customer. In this case, the CSR is presented with an interface showing at least one of the customer context, the authentication context, account information associated with the customer and the like.

In one embodiment, the communication may be enabled by the mobile device, when the application initiates the communication, for example, a voice communication, with the CSC. The voice communication may be initiated depending upon an instruction to initiate the voice communication. The instruction may be received from the CSC or may be stored in the application. According to one embodiment, the application initiates the voice communication to a phone number, for example, to a phone number corresponding to the CSC. In one embodiment, the phone number may be stored in the application or the phone number may be received from the CSC. The phone number may be fixed or may be determined based upon one or more factors. Examples of the factors include, but are not limited to, the user context, the authentication context, a time of day, a day of week, the application, user's geographic location, the application, a work load associated with the CSC, user's preferences and the like. For example, if the user is in USA, the application and/or the CSC may select a US phone number; on the other hand, if the user is in Germany, a phone number may correspond to a Germany-based CSC or a CSC that serves customers residing in Germany. In another example, the phone number may be determined based upon the user's preferences, such as, language preferences, so that the customer communicates with a CSR proficient in the customer's language preference. In additional examples, the phone number may be different for weekends as opposed to weekdays.

In various embodiments, the communication may be enabled upon receiving a communication from the CSC. For example, in response to receiving the communication request from the mobile device, the CSC may initiate the communication to a phone number associated with the mobile device or any other phone number of the customer.

In accordance with one embodiment, the communication between the CSC and the user occurs without any input by the customer. In another embodiment, the customer may have to provide an explicit input to initiate the communication between the CSC and the customer. The customer may provide the input, for example, by one or more of clicking on a soft button, selecting an option from a menu, pressing one or more keys on the mobile device and the like.

In some embodiments, the communication occurs in response to the customer satisfying one or more conditions including, for example, the customer has navigated through a predefined number of menus, answered one or more questions, entered desired data, responded to voice prompts, waited on hold for a certain duration and the like. Alternatively, the communication may occur regardless of whether the customer satisfies any of the conditions.

When the customer does not have access to services of the CSC, a help file may be displayed to the customer or the customer is led to a website or a message is displayed to the customer to enable the communication.

IV. Example Implementations

The present disclosure (i.e., system 100, mobile device 102, process 300 or any part(s) or function(s) thereof) may be implemented using hardware, software or a combination thereof, and may be implemented in one or more computer systems or other processing systems. However, the manipulations performed by the present disclosure were often referred to in terms, such as comparing or checking, which are commonly associated with mental operations performed by a human operator. No such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

Figure 4:
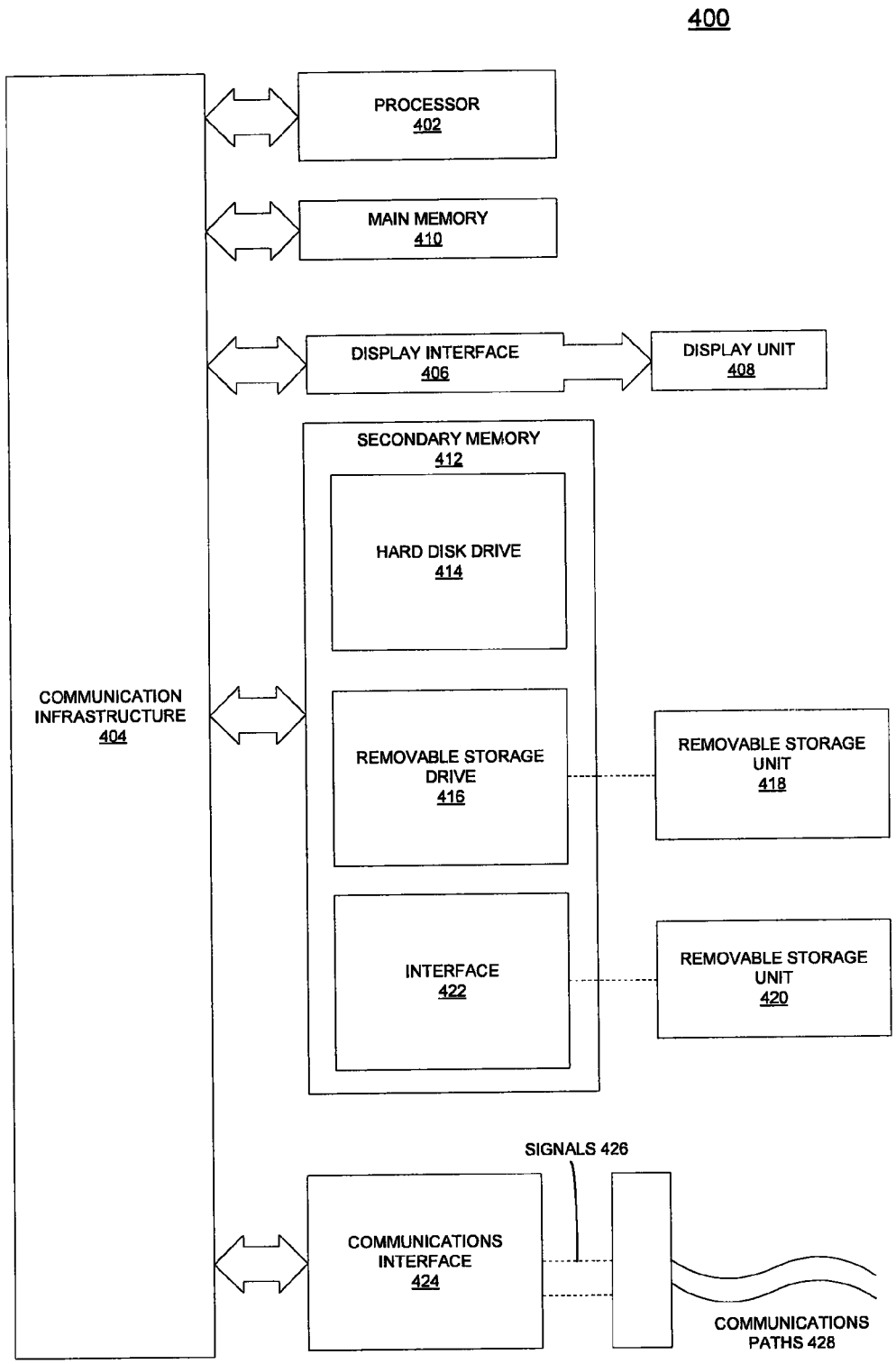
FIG. 4 is a block diagram of an exemplary computer system for implementing the present disclosure.

In fact, in accordance with an embodiment, the present disclosure is directed towards one or more computer systems capable of carrying out the functionality described herein. An example of the computer systems includes a computer system 400, which is shown in FIG. 4.

The computer system 400 includes at least one processor, such as a processor 402. Processor 402 is connected to a communication infrastructure 404, for example, a communications bus, a cross over bar, a network, and the like. Various software embodiments are described in terms of this exemplary computer system 400. After reading this description, it will become apparent to a person skilled in the relevant art(s) how to implement the present disclosure using other computer systems and/or architectures.

The computer system 400 includes a display interface 406 that forwards graphics, text, and other data from the communication infrastructure 404 (or from a frame buffer which is not shown in FIG. 4) for display on a display unit 408.

The computer system 400 further includes a main memory 410, such as random access memory (RAM), and may also include a secondary memory 412. The secondary memory 412 may further include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a well known manner. The removable storage unit 418 may represent a floppy disk, magnetic tape or an optical disk, and may be read by and written to by the removable storage drive 416. As will be appreciated, the removable storage unit 418 includes a computer usable storage medium having stored therein, computer software and/or data.

In accordance with various embodiments, the secondary memory 412 may include other similar devices for allowing computer programs or other instructions to be loaded into the computer system 400. Such devices may include, for example, a removable storage unit 420, and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units 420 and interfaces 422, which allow software and data to be transferred from the removable storage unit 420 to the computer system 400.

The computer system 400 may further include a communication interface 424. The communication interface 424 allows software and data to be transferred between the computer system 400 and external devices. Examples of the communication interface 424 include, but may not be limited to a modem, a network interface (such as an Ethernet card), a communications port, a Personal Computer Memory Card International Association (PCMCIA) slot and card, and the like. Software and data transferred via the communication interface 424 are in the form of a plurality of signals, hereinafter referred to as signals 426, which may be electronic, electromagnetic, optical or other signals capable of being received by the communication interface 424. The signals 426 are provided to the communication interface 424 via a communication path (e.g., channel) 428. A communication path 428 carries the signals 426 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 416, a hard disk installed in hard disk drive 414, the signals 426, and the like. These computer program products provide software to the computer system 400. The present disclosure is directed to such computer program products.

Computer programs (also referred to as computer control logic) are stored in the main memory 410 and/or the secondary memory 412. Computer programs may also be received via the communication infrastructure 404. Such computer programs, when executed, enable the computer system 400 to perform the features of the present disclosure, as discussed herein. In particular, the computer programs, when executed, enable the processor 402 to perform the features of the present disclosure. Accordingly, such computer programs represent controllers of the computer system 400.

In accordance with an embodiment, where the disclosure is implemented using software, the software may be stored in a computer program product and loaded into the computer system 400 using the removable storage drive 416, the hard disk drive 414 or the communication interface 424. The control logic (software), when executed by the processor 402, causes the processor 402 to perform the functions of the present disclosure as described herein.

In another embodiment, the present disclosure is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present disclosure is implemented using a combination of both the hardware and the software.

V. Conclusion

The various embodiments described above have been presented by way of example and not limitation. It will be apparent to persons skilled in the relevant art(s) that various changes in form and detail can be made therein (e.g., different hardware, communications protocols, and the like) without departing from the spirit and scope of the present disclosure. Thus, the present disclosure should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present disclosure, are presented as illustrative examples. The architecture of the present disclosure is sufficiently flexible and configurable, such that it may be utilized (and navigated) in ways other than that shown in the drawings.

The invention claimed is:

1. A method, comprising:
   receiving, at a mobile device, a request to access a customer service feature of an application associated with the mobile device;
   in response to the request, enabling, by the mobile device and via the application, wireless communication between a customer service center (CSC) and a user of the mobile device using a conditionally determined phone number; accessing, by the mobile device and in response to the request, user activity information for the application, wherein the user activity information identifies a particular customer service feature of the application as being viewed at a specific starting time and for a specific length of time by the user when the communication is established; and
   sending, by the mobile device, the user activity information to a customer service representative of the CSC.

2. The method of claim 1, wherein the application is installed in a memory of the mobile device.

3. The method of claim 1, wherein the accessing comprises retrieving information from at least one of an activity log or a request file associated with the application.

4. The method of claim 1, further comprising receiving a request for authentication from the CSC.

5. The method of claim 1, further comprising determining an authentication context.

6. The method of claim 5, wherein the determining the authentication context comprises at least one of accessing a token, encrypting data, receiving user input, accessing mobile device characteristics or accessing a user profile associated with at least one of the mobile device or the application.

7. The method of claim 5, wherein the authentication context comprises at least one of a social security number, an account number, a user identification number, a personal identification number, a password, a token, a biometric, an authentication code associated with the mobile device, and an authentication code associated with the application.

8. The method of claim 5, wherein the determining the authentication context is in response to an authentication request received from the CSC.

9. The method of claim 1, wherein the wireless communication comprises at least one of voice communication, text message, video communication, audio-video communication, internet protocol (IP) based chat, voice over IP.

10. The method of claim 1, wherein the enabling includes initiating, by the application, voice communication with the CSC.

11. The method of claim 10, wherein the voice communication is initiated based upon at least one of a phone number stored in the application, an instruction stored in the application, a phone number received from the CSC or an instruction received from the CSC.

12. The method of claim 11, wherein the phone number is determined based on a user context, an authentication context, a time of day, a day of week, the application, or a work load associated with the CSC.

13. A non-transitory computer readable medium having program instructions stored thereon, wherein the program instructions are executable by a mobile device to cause the mobile device to perform operations comprising:
   receiving an indication that a user of the mobile device has requested to wirelessly communicate with a customer service center (CSC) regarding an application;
   in response to the indication, establishing a connection between the user and the CSC using a conditionally determined phone number;
   retrieving user activity information for the application, wherein the user activity information identifies a particular customer service application feature as being accessed at a specific starting time and for a specific length of time by the user during establishment of the connection; and
   conveying the user activity information to a customer service representative of the CSC.

14. The computer readable medium of claim 13, wherein the user activity information identifies 1) a plurality of application features viewed by the user and 2) an ordering in which the user viewed the plurality of application features.

15. The computer readable medium of claim 13, wherein the operations comprise:
   presenting, via the application, balance information of a financial account of the user, wherein the user activity information indicates that the user was accessing the balance information during establishment of the connection.

16. The computer readable medium of claim 13, wherein the operations comprise:
   indicating an error to the user in response to the user accessing the particular customer service application feature, wherein the activity information specifies that the error was indicated to the user.

17. The method of claim 1, wherein the user activity information specifies an ordering in which the user viewed a plurality of features of the application.

18. The method of claim 1, wherein the application provides financial services to the user, and wherein the particular customer service feature corresponds to a financial service provided by the application.

19. The method of claim 1, wherein the user activity information specifies that the user received an error when the particular customer service feature was viewed.

20. The method of claim 1, wherein the phone number is determined based on a location of the mobile device.

* * * * *